(12) United States Patent
Irifune et al.

(10) Patent No.: US 11,214,920 B2
(45) Date of Patent: Jan. 4, 2022

(54) FIBER TREATMENT AGENT FOR ELECTRON BEAM FIXING

(71) Applicants: SHIN-ETSU CHEMICAL CO., LTD., Tokyo (JP); KURASHIKI BOSEKI KABUSHIKI KAISHA, Kurashiki (JP)

(72) Inventors: Shinji Irifune, Gunma (JP); Tomoya Kanai, Gunma (JP); Masaki Tanaka, Tokyo (JP); Minoru Sugiyama, Osaka (JP); Kunihiro Ohshima, Osaka (JP)

(73) Assignees: Shin-Etsu Chemical Co., Ltd., Tokyo (JP); Kurashiki Boseki Kabushiki Kaisha, Okayama (JP)

( * ) Notice: Subject to any disclaimer, the term of this patent is extended or adjusted under 35 U.S.C. 154(b) by 123 days.

(21) Appl. No.: 16/499,120

(22) PCT Filed: Mar. 16, 2018

(86) PCT No.: PCT/JP2018/010518
§ 371 (c)(1),
(2) Date: Sep. 27, 2019

(87) PCT Pub. No.: WO2018/180615
PCT Pub. Date: Oct. 4, 2018

(65) Prior Publication Data
US 2020/0040521 A1 Feb. 6, 2020

(30) Foreign Application Priority Data

Mar. 31, 2017 (JP) .............................. JP2017-072047
Aug. 4, 2017 (JP) .............................. JP2017-151912

(51) Int. Cl.
| | |
|---|---|
| D06M 15/643 | (2006.01) |
| C08G 77/14 | (2006.01) |
| C08G 77/26 | (2006.01) |
| D06M 14/20 | (2006.01) |
| D06M 14/26 | (2006.01) |

(52) U.S. Cl.
CPC ........... *D06M 15/643* (2013.01); *C08G 77/14* (2013.01); *C08G 77/26* (2013.01); *D06M 14/20* (2013.01); *D06M 14/26* (2013.01)

(58) Field of Classification Search
CPC ......... C08L 83/04; C08G 77/20; C08G 77/26; D06M 15/643; C09D 183/06
See application file for complete search history.

(56) References Cited

U.S. PATENT DOCUMENTS

| | | | |
|---|---|---|---|
| 3,817,894 A | | 6/1974 | Butler |
| 4,189,546 A | * | 2/1980 | Deichert ................ C08G 77/20 528/26 |
| 4,464,506 A | | 8/1984 | Alberts et al. |
| 4,603,086 A | | 7/1986 | Fujii et al. |
| 4,698,406 A | | 10/1987 | Lo et al. |
| 4,987,180 A | | 1/1991 | Ohata et al. |
| 5,464,801 A | | 11/1995 | Kosal et al. |
| 5,576,096 A | | 11/1996 | Ono et al. |
| 5,827,921 A | | 10/1998 | Osawa et al. |
| 7,732,536 B2 | | 6/2010 | Chrobaczek et al. |
| 2003/0068442 A1 | | 4/2003 | Tully et al. |
| 2010/0129562 A1 | | 5/2010 | Chrobaczek et al. |

(Continued)

FOREIGN PATENT DOCUMENTS

| | | |
|---|---|---|
| CA | 1123530 | 5/1982 |
| CN | 101111536 | 1/2008 |

(Continued)

OTHER PUBLICATIONS

Dodd, et al., "Ultraviolet Radiation Curing Treatments for Shrink-Resistant Wool Fabric", Textile Research Journal, vol. 68, No. 1, Jan. 1998, pp. 10-16.
Extended European Search Report issued in European Patent Application No. 18775316.5, dated Dec. 21, 2020, 9 pages.
Extended European Search Report issued in European Patent Application No. 18776645.6, dated Dec. 11, 2020, 8 pages.
Office Action issued in co-pending U.S. Appl. No. 16/499,083, dated Sep. 9, 2021, 28 pages.

(Continued)

*Primary Examiner* — Kuo Liang Peng
(74) *Attorney, Agent, or Firm* — Hamre, Schumann, Mueller & Larson, P.C.

(57) ABSTRACT

The present invention relates to a fiber treatment agent for electron beam fixing that contains an acrylic-modified organopolysiloxane (A) having two or more acrylic groups per molecule, as represented by the following general formula (I).

$$M_a M^4_b D_c D^4_d T_e \qquad (I)$$

(in the general formula (I), $M=R^1R^2R^3SiO_{1/2}$, $M^4=R^4R^5R^6SiO_{1/2}$, $D=R^7R^8SiO_{2/2}$, $D^4=R^9R^{10}SiO_{2/2}$, $T=R^{11}SiO_{3/2}$, $R^1$ to $R^{11}$ each independently represent a hydrogen atom, an alkyl group having 1 to 4 carbon atoms, or a phenyl group, $R^4$ and $R^9$ each independently represent a monovalent hydrocarbon group represented by the following general formula (II), a, to d each independently are 0 or a positive integer, e is an integer of 0 to 3, c+d is an integer of 10 to 1000, b+d is an integer of at least 2, and a+b is an integer equal to e+2.)

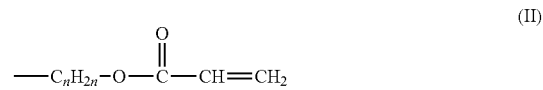

(in the general formula (II), n is an integer of 1 to 3).

8 Claims, No Drawings

(56) References Cited

U.S. PATENT DOCUMENTS

2013/0085203 A1 4/2013 Tsuchida et al.
2020/0040520 A1 2/2020 Irifune et al.

FOREIGN PATENT DOCUMENTS

| | | |
|---|---|---|
| CN | 103030810 | 4/2013 |
| EP | 0 267 004 | 11/1987 |
| EP | 0 632 157 | 6/1994 |
| EP | 0 661 399 | 7/1995 |
| EP | 3 604 666 | 5/2020 |
| FR | 2 352 088 | 12/1977 |
| JP | 52-132171 | 11/1977 |
| JP | 56-016553 | 2/1981 |
| JP | 58-126378 | 7/1983 |
| JP | 62-269906 | 11/1987 |
| JP | 63-128074 | 5/1988 |
| JP | 1-168971 | 7/1989 |
| JP | 2-000657 | 1/1990 |
| JP | 7-097770 | 4/1995 |
| JP | 7-204516 | 8/1995 |
| JP | 8-085760 | 4/1996 |
| JP | 9-208826 | 8/1997 |
| JP | 9-208900 | 8/1997 |
| JP | 9-208901 | 8/1997 |
| JP | 9-208902 | 8/1997 |
| JP | 9-208903 | 8/1997 |
| JP | 2002-363494 | 12/2002 |
| JP | 2005-500442 | 1/2005 |
| JP | 2007-177232 | 7/2007 |
| JP | 2008-231276 | 10/2008 |
| JP | 2013-082895 | 5/2013 |
| JP | 2016-102272 | 6/2016 |
| JP | 2016-199712 | 12/2016 |
| JP | 2018-172835 | 11/2018 |

OTHER PUBLICATIONS

Zeng Xiaoying et al., "Electron Beam Cured Coatings and Applications", Tianjin University Press, pp. 144-145, Jun. 2014.

Office Action issued in corresponding Chinese Patent Application No. 201880021919.5, Aug. 24, 2021, 17 pages w/translation.

* cited by examiner

FIBER TREATMENT AGENT FOR ELECTRON BEAM FIXING

TECHNICAL FIELD

The present invention relates to a fiber treatment agent for electron beam fixing that contains silicone to be fixed to fibers by electron beam irradiation.

BACKGROUND ART

A wide variety of organopolysiloxanes such as a dimethylpolysiloxane, an epoxy group containing organopolysiloxane, and an amino group containing organopolysiloxane have been used as a fiber treatment agent for imparting softness, smoothness, etc. to various fibers and fiber products. In particular, the amino group containing organopolysiloxane provides good softness and is used in a larger amount than any other organopolysiloxane. The fiber treatment agent is generally in the form of an emulsion containing water as a dispersion medium. In the most common method for the treatment of fibers, the fibers are coated or impregnated with the emulsion, and then dried by heating. The fibers treated with silicone have an excellent texture immediately after the treatment. However, the effective component (silicone) of the treatment agent is washed away from the fibers after washing several times, and thus the texture will be reduced. The reason for this may be that the above silicone treatment agent is unable to react with the fibers, and the silicone is not fixed to the fiber surface, but is present on the fiber surface due to a weak adsorption effect of the amino group on the fibers.

Therefore, e.g., further studies have been made to incorporate silicone oil into synthetic resins to form synthetic fibers such as polyester fibers, nylon fibers, and acrylic fibers. However, since the compatibility between the silicone and these synthetic resins is low, it is very difficult to form uniform fibers in which the synthetic resins and the silicone are mixed together. Accordingly, the use of silicone having a functional group that may react with a functional group present on the fiber surface, such as an epoxy group or an alkoxy group, has also been considered. However, if the silicone having such a functional group is in the form of an emulsion, the emulsion has poor stability over time, so that the treatment agent cannot be used because it becomes thickened before use.

To deal with the issue, there is a method for forming a silicone rubber film on the surface. The rubber film is composed of a curable silicone emulsion composition, which is conventionally known to have various compositions. For example, Patent Document 1 proposes a silicone emulsion composition that includes an anionically stabilized hydroxylated diorganopolysiloxane, colloidal silica, and an organotin compound or an organic amine compound and has a pH of 9 to 11.5. Patent Document 2 discloses a silicone latex composition that includes a siloxane block copolymer having dimethylsiloxane units and monophenylsiloxane units, water, a cationic surfactant, a filler, and an aminosilane. Patent Document 3 proposes a silicone emulsion composition that includes a hydroxyl group containing organopolysiloxane, a Si—H group containing organopolysiloxane, colloidal silica, an amide group and carboxyl group containing silane, an epoxy group containing silane, and a curing catalyst. Patent Document 4 proposes a silicone emulsion composition that includes an alkenyl group containing organopolysiloxane, a Si—H group containing organopolysiloxane, colloidal silica, a reaction product of an aminosilane and an acid anhydride, an epoxysilane, and an addition reaction catalyst. Patent Document 5 proposes a silicone emulsion composition that includes a hydrogen siloxane in which the molecular terminal is blocked with a hydroxyl group, an emulsifier, water, and a curing catalyst. Patent Documents 6 to 8 propose a silicone emulsion composition that includes a colloidal silica-silicone core-shell body, a curing catalyst, an emulsifier, and water. Patent Document 9 proposes a silicone emulsion composition that includes a hydroxyl group containing organopolysiloxane, colloidal silica, an amide group and carboxyl group containing silane, an epoxy group containing silane, a curing catalyst, and a photocatalytic oxide. Patent Document 10 proposes a silicone emulsion composition that includes a hydroxyl group containing organopolysiloxane, colloidal silica, an amide group and carboxyl group containing silane, and an epoxy group containing silane.

PRIOR ART DOCUMENTS

Patent Documents

Patent Document 1: JP S56(1981)-16553 A
Patent Document 2: U.S. Pat. No. 3,817,894
Patent Document 3: JP H8(1996)-85760 A
Patent Document 4: JP H9(1997)-208826 A
Patent Document 5: JP H9(1997)-208900 A
Patent Document 6: JP H9(1997)-208901 A
Patent Document 7: JP H9(1997)-208902 A
Patent Document 8: JP H9(1997)-208903 A
Patent Document 9: JP 2002-363494 A
Patent Document 10: JP 2008-231276 A

DISCLOSURE OF INVENTION

Problem to be Solved by the Invention

In Patent Documents 1 to 10, organotin compounds are typically used as a curing catalyst. However, the use of organotin compounds is being restricted or regulated in applications, fields, and countries because of its toxicity. Therefore, the replacement of dibutyltin compounds by octyltin compounds, and further the replacement of octyltin compounds by inorganic tin compounds or other metal compounds have been proposed, but no effective catalyst system has been found yet. Thus, treatment agents and treatment methods are still required that can maintain the effect of the silicone treatment agent even after washing without using, e.g., toxic metal catalysts.

In order to solve the above problems, the present invention provides a fiber treatment agent for electron beam fixing that contains silicone to be firmly fixed to fibers by electron beam irradiation and that can impart a good texture to the fibers even after washing.

Means for Solving Problem

The present invention relates to a fiber treatment agent for electron beam fixing that contains an acrylic-modified organopolysiloxane (A) having two or more acrylic groups per molecule, as represented by the following general formula (I).

[Chemical Formula 1]

$$M_a M^A_b D_c D^A_d T_e \quad (I)$$

(in the general formula (I), $M=R^1R^2R^3SiO_{1/2}$, $M^A=R^4R^5R^6SiO_{1/2}$, $D=R^7R^8SiO_{2/2}$, $D^A=R^9R^{10}SiO_{2/2}$, $T=R^{11}SiO_{3/2}$, $R^1$, $R^2$, $R^3$, $R^5$, $R^6$, $R^7$, $R^8$, $R^{10}$, and $R^{11}$ each independently represent a hydrogen atom, an alkyl group having 1 to 4 carbon atoms, or a phenyl group, $R^4$ and $R^9$ each independently represent a monovalent hydrocarbon group represented by the following general formula (II), a, b, c, and d each independently are 0 or a positive integer, e is an integer of 0 to 3, c+d is an integer of 10 to 1000, b+d is an integer of 2 or more, and a+b is an integer equal to e+2.)

[Chemical Formula 2]

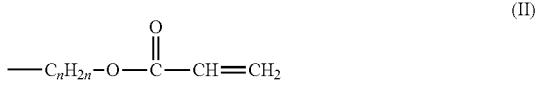

(II)

(in the general formula (II), n is an integer of 1 to 3.)

In one embodiment of the present invention, it is preferable that the fiber treatment agent for electron beam fixing further contains an amino-modified organopolysiloxane (B) having one or more amino groups per molecule, as represented by the following general formula (III).

[Chemical Formula 3]

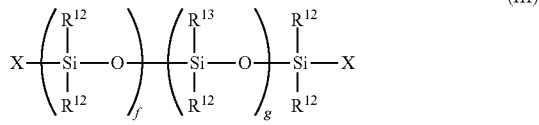

(III)

(in the general formula (III), $R^{12}$ represents a monovalent hydrocarbon group having 1 to 20 carbon atoms, $R^{13}$ represents a monovalent group represented by —$R^{14}$—(NH—$R^{15}$)h-$NH_2$, X represents a monovalent group represented by $R^{12}$, $R^{13}$, or —$OR^{16}$, $R^{14}$ represents a divalent hydrocarbon group having 1 to 8 carbon atoms, $R^{15}$ represents a divalent hydrocarbon group having 1 to 4 carbon atoms, $R^{16}$ represents a hydrogen atom or a monovalent hydrocarbon group having 1 to 8 carbon atoms, f is an integer of 5 to 500, g is an integer of 0 to 100, and h is an integer of 0 to 4, where if g is 0, at least one of two Xs is $R^{13}$.)

In the general formula (I), (b+d)/(a+b+c+d)×100 is preferably 0.5 to 40.

In one embodiment of the present invention, when the total mass of the acrylic-modified organopolysiloxane (A) and the amino-modified organopolysiloxane (B) is 100% by mass, it is preferable that the blending amount of the acrylic-modified organopolysiloxane (A) is 10 to 95% by mass and the blending amount of the amino-modified organopolysiloxane (B) is 5 to 90% by mass.

In one embodiment of the present invention, the fiber treatment agent for electron beam fixing is preferably in the form of an emulsion.

Effects of the Invention

The fiber treatment agent for electron beam fixing of the present invention allows the silicone to be firmly fixed to fibers by electron beam irradiation and can impart a good texture to the fibers even after washing.

DESCRIPTION OF THE INVENTION

The present inventors conducted many studies to improve the washing durability of silicone-treated fibers. Consequently, the present inventors found that when fibers were treated with a fiber treatment agent containing an acrylic-modified organopolysiloxane (A) having two or more acrylic groups per molecule, as represented by the following general formula (I), and then the treated fibers were irradiated with an electron beam, silicone was firmly fixed to the fibers and the fibers could have a soft texture of silicone even after washing. Based on these findings, the present inventors have reached the present invention. In this specification, the term "fiber treatment agent for electron beam fixing" means a fiber treatment agent that is fixed to fibers by an electron beam treatment. Moreover, in this specification, the term "silicone" means a compound in which the main skeleton is composed of a siloxane bond of silicon and oxygen, and an organic group is attached to the silicon.

The acrylic-modified organopolysiloxane (A) is an acrylic-modified organopolysiloxane having two or more acrylic groups per molecule, as represented by the following general formula (I).

[Chemical Formula 4]

(I)

In the general formula (I), $M=R^1R^2R^3SiO_{1/2}$, $M^A=R^4R^5R^6SiO_{1/2}$, $D=R^7R^8SiO_{2/2}$, $D^A=R^9R^{10}SiO_{2/2}$, $T=R^{11}SiO_{3/2}$, $R^1$, $R^2$, $R^3$, $R^5$, $R^6$, $R^7$, $R^8$, $R^{10}$, and $R^{11}$ each independently represent a hydrogen atom, an alkyl group having 1 to 4 carbon atoms, or a phenyl group. Examples of the alkyl group having 1 to 4 carbon atoms include methyl, ethyl, propyl, and butyl groups. In the general formula (I), $R^1$, $R^2$, $R^3$, $R^5$, $R^6$, $R^7$, $R^8$, $R^{10}$, and $R^{11}$ each more preferably represent a methyl group.

In the general formula (I), $R^4$ and $R^9$ each independently represent a monovalent hydrocarbon group represented by the following general formula (II). The acrylic groups represented by the general formula (II) may be the same as or different from each other. In the general formula (I), (b+d)/(a+b+c+d)×100 is preferably 0.5 to 40, more preferably 1 to 20, and further preferably 1 to 15. When (b+d)/(a+b+c+d)×100 is 0.5 or more, the fixing properties of the silicone to the fibers by electron beam irradiation become better. When (b+d)/(a+b+c+d)×100 is 40 or less, the silicone fixed to the fibers is not too hard, and the fibers have excellent softness. In the general formula (I), $R^1$, $R^2$, $R^3$, $R^5$, $R^6$, $R^7$, $R^8$, $R^{10}$, and $R^{11}$ each preferably represent a methyl group in terms of ease of production and the texture imparted to the fibers.

[Chemical Formula 5]

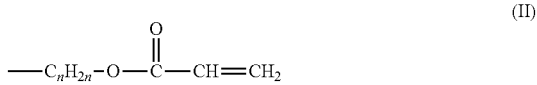

(II)

In the general formula (II), n is an integer of 1 to 3. From the viewpoint of improving the fixing properties of the silicone to the fibers and the softness, n is preferably 3.

In the general formula (I), a, b, c, and d each independently are 0 or a positive integer, e is an integer of 0 to 3, and c+d is an integer of 10 to 1000, where b+d is an integer of 2 or more and a+b is an integer equal to e+2. The viscosity of the acrylic-modified organopolysiloxane (A) is preferably 50 to 5000 mPa·s at 25° C. If the viscosity is less than 50 mPa·s, the acrylic-modified organopolysiloxane (A) is not likely to adhere to the fibers. If the viscosity is more than 5000 mPa·s, the composition will have a higher viscosity, and thus the treatment of the fibers tends to be difficult. It is preferable that the viscosity of the acrylic-modified organopolysiloxane (A) falls within the range of 50 to 5000 mPa·s at 25° C. by appropriately adjusting the values of a, b, c, d, and e in the general formula (I). The viscosity of the acrylic-modified organopolysiloxane (A) is more preferably 100 to 1000 mPa·s at 25° C. Moreover, e is preferably 0 or 1. The acrylic-modified organopolysiloxane (A) may be either a single acrylic-modified organopolysiloxane or a mixture of a plurality of acrylic-modified organopolysiloxanes which differ in the degree of polymerization and the amount of functional groups.

In one embodiment of the present invention, from the viewpoint of improving the softness of the fibers, it is preferable that the fiber treatment agent for electron beam fixing further contains an amino-modified organopolysiloxane (B) having one or more amino groups per molecule, as represented by the following general formula (III).

[Chemical Formula 6]

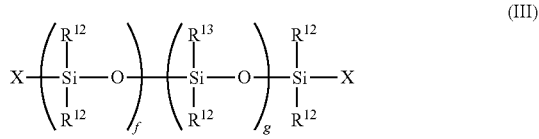

(III)

In the general formula (III), $R^{12}$ represents a substituted or unsubstituted monovalent hydrocarbon group having 1 to 20 carbon atoms. Specific examples of the substituted or unsubstituted monovalent hydrocarbon group having 1 to 20 carbon atoms include the following: alkyl groups such as methyl, ethyl, propyl, butyl, pentyl, hexyl, heptyl, octyl, and decyl groups; alkenyl groups such as vinyl and allyl groups; cycloalkyl groups such as cyclopentyl and cyclohexyl groups; aryl groups such as phenyl, tolyl, and naphthyl groups; and substituted forms of these groups in which some of hydrogen atoms bonded to carbon atoms are substituted by halogen atoms. Among them, the methyl group is particularly preferred in terms of water repellency, smoothness and softness. A plurality of $R^{12}$s may be the same as or different from each other.

In the general formula (III), $R^{13}$ represents a monovalent group represented by $-R^{14}-(NH-R^{15})h-NH_2$. $R^{14}$ represents a divalent hydrocarbon group having 1 to 8 carbon atoms. Specific examples of the divalent hydrocarbon group having 1 to 8 carbon atoms include methylene, dimethylene, trimethylene, and tetramethylene groups. Among them, the trimethylene group is preferred. $R^{15}$ represents a divalent hydrocarbon group having 1 to 4 carbon atoms. Specific examples of the divalent hydrocarbon group having 1 to 4 carbon atoms include methylene, dimethylene, trimethylene, and tetramethylene groups. Among them, the dimethylene group is preferred. In $R^{13}$, h is an integer of 0 to 4.

In the general formula (III), X represents a monovalent group represented by $R^{12}$, $R^{13}$, or $-OR^{16}$. $R^{12}$ and $R^{13}$ are as described above. $R^{16}$ represents a hydrogen atom or a monovalent hydrocarbon group having 1 to 8 carbon atoms. Specific examples of the monovalent hydrocarbon group having 1 to 8 carbon atoms include methyl, ethyl, propyl, butyl, pentyl, hexyl, octyl, and phenyl groups. Among them, X is particularly preferably a methyl group and/or a methoxy group.

In the general formula (III), f is an integer of 5 to 500, and preferably an integer of 10 to 200. If f is less than 5, surface smoothness and water repellency are poor. If f is more than 500, the viscosity is increased and the reactivity of the amino group with the acrylic group is reduced. In the general formula (III), g is an integer of 0 to 100, and preferably an integer of 0 to 50. If g is more than 100, the number of amino groups is too large, which may result in an increase in stickiness and a loss of water repellency. In the general formula (III), if g is 0, at least one of two Xs is adjusted to be $R^{13}$.

The viscosity of the amino-modified organopolysiloxane (B) is preferably 50 to 5000 mPa·s at 25° C. If the viscosity is less than 50 mPa·s, the amino-modified organopolysiloxane (B) is not likely to adhere to the fibers. If the viscosity is more than 5000 mPa·s, the composition will have a higher viscosity, and thus the treatment of the fibers tends to be difficult. The viscosity of the amino-modified organopolysiloxane (B) is more preferably 100 to 1000 mPa·s at 25° C.

In one embodiment of the present invention, from the viewpoint of improving the fixing properties of the silicone to the fibers and the texture of the fibers, when the total mass of the acrylic-modified organopolysiloxane (A) and the amino-modified organopolysiloxane (B) is 100% by mass, the blending amount of the acrylic-modified organopolysiloxane (A) is preferably, but not limited to, 10 to 95% by mass, and more preferably 30 to 90% by mass and the blending amount of the amino-modified organopolysiloxane (B) is preferably, but not limited to, 5 to 90% by mass, and more preferably 10 to 70% by mass.

In one embodiment of the present invention, the silicone component, i.e., the acrylic-modified organopolysiloxane (A) or the mixture of the acrylic-modified organopolysiloxane (A) and the amino-modified organopolysiloxane (B) may be directly used as the fiber treatment agent for electron beam fixing.

In one embodiment of the present invention, from the viewpoint of handleability, the silicone component may be diluted with an organic solvent to form a solution, and this solution may be used as the fiber treatment agent for electron beam fixing. Examples of the organic solvent include the following: aromatic hydrocarbon solvents such as toluene and xylene; aliphatic hydrocarbon solvents such as hexane, octane, and isoparaffin; ether solvents such as diisopropyl ether and 1,4-dioxane; and a mixed solvent thereof. The aromatic hydrocarbon solvents such as toluene and xylene and the aliphatic hydrocarbon solvents such as hexane, octane, and isoparaffin are particularly preferred. The dilute concentration of the silicone component is not particularly limited. For example, the concentration of the acrylic-modified organopolysiloxane (A) or the total concentration of the acrylic-modified organopolysiloxane (A) and the amino-modified organopolysiloxane (B) may be 1 to 60% by mass, and more preferably 1 to 20% by mass.

In one embodiment of the present invention, the silicone component may be dispersed in water as a dispersion medium to form an emulsion, and this emulsion may be used as the fiber treatment agent for electron beam fixing. The emulsification may use, e.g., a nonionic surfactant, an anionic surfactant, a cationic surfactant, or an amphoteric surfactant. The nonionic surfactant is not particularly limited and may be, e.g., polyoxyethylene alkyl ether, polyoxyethylene alkyl phenyl ether, sorbitan alkylate, or polyoxyethylene sorbitan alkylate. The anionic surfactant is not particularly limited and may be, e.g., alkylbenzene sulfonate or alkyl phosphate. The cationic surfactant is not particularly limited and may be, e.g., quaternary ammonium salts or alkylamine salts. The amphoteric surfactant is not particularly limited and may be, e.g., alkyl betaine or alkyl imidazoline. These surfactants may be used individually or in combinations of two or more. There is no particular limitation to the surfactants. However, from the viewpoint of ease of emulsification of the silicone, the HLB (hydrophilic-lipophilic balance) of the surfactants is preferably 11 to 18, and more preferably 13 to 16.

The amount of the surfactant used is preferably 5 to 50 parts by mass, and more preferably 10 to 30 parts by mass with respect to 100 parts by mass of the silicone component, i.e., the acrylic-modified organopolysiloxane (A) or the mixture of the acrylic-modified organopolysiloxane (A) and the amino-modified organopolysiloxane (B). Any suitable amount of water may be used for emulsification. However, water may be used in an amount such that the concentration of the acrylic-modified organopolysiloxane (A) or the total concentration of the acrylic-modified organopolysiloxane (A) and the amino-modified organopolysiloxane (B) is generally 1 to 60% by mass, and preferably 1 to 20% by mass. The emulsification may be performed by mixing the acrylic-modified organopolysiloxane (A) or the acrylic-modified organopolysiloxane (A) and the amino-modified organopolysiloxane (B) with the surfactant, and emulsifying the mixture with an emulsifier such as a homomixer, a homogenizer, a colloid mill, or a line mixer.

In one embodiment of the present invention, when both the acrylic-modified organopolysiloxane (A) and the amino-modified organopolysiloxane (B) are used as the silicone component, these components may be mixed in advance to form a solution or an emulsion. Alternatively, these components may be separately formed in advance into solutions or emulsions, and then the respective solutions or emulsions may be mixed together.

In one embodiment of the present invention, other agents for fibers such as an anticrease agent, a flame retardant, an antistatic agent, and a heat resistant agent may be added to the fiber treatment agent for electron beam fixing as long as the properties of the fiber treatment agent are not impaired.

The fibers are coated or impregnated with the fiber treatment agent for electron beam fixing, and then the treated fibers are irradiated with an electron beam, so that silicone can be fixed to the fibers. When the fiber treatment agent for electron beam fixing that has adhered to the fibers is irradiated with an electron beam, the acrylic-modified organopolysiloxane (A) in the fiber treatment agent is graft-polymerized onto the fibers, and crosslinking between the silicone components also proceeds to cure the silicone. Therefore, the silicone is firmly fixed to the fibers.

The fibers to be treated with the fiber treatment agent for electron beam fixing are not particularly limited. Examples of the fibers include natural fibers such as cotton, silk, hemp, wool, angora, and mohair, synthetic fibers such as polyester fibers, nylon fibers, acrylic fibers, and spandex, and fiber products made of these fibers. Moreover, the form and shape of the fibers are not particularly limited. Not only the materials in the form of, e.g., staple, filament, tow, and yarn, but also various processed products in the form of, e.g., woven fabric, knitted fabric, wadding, nonwoven fabric, paper, sheet, and film can be treated with the fiber treatment agent for electron beam fixing.

In this case, any known method such as roll coating, gravure coating, wire doctor coating, air knife coating, or dipping may be used to coat or impregnate the fibers with the fiber treatment agent for electron beam fixing. The coating or impregnation amount is preferably 0.01 to 20.0 g/m², and more preferably 0.01 to 5 g/m². When the coating or impregnation amount is within the above range, the adhesion of the silicone to the fibers can be improved.

In one embodiment of the present invention, when the fiber treatment agent for electron beam fixing is a solution obtained by diluting the silicone with an organic solvent, or an emulsion obtained by dispersing the silicone in water, the fibers coated or impregnated with the fiber treatment agent for electron beam fixing may be dried to vaporize the organic solvent or the water (the dispersion medium of the emulsion). The drying may be performed, e.g., by blowing hot air on the fibers or using a heating furnace. The drying temperature and the drying time may be determined as desired so as not to affect the fibers. For example, the drying temperature may be 100 to 150° C. and the drying time may be 10 sec to 5 min.

The fibers coated or impregnated with the fiber treatment agent for electron beam fixing are irradiated with an electron beam by using an electron beam irradiation apparatus. The electron beam irradiation apparatus is not particularly limited and may be, e.g., a curtain system, a scanning system, or a double scanning system. The acceleration voltage of the electron beam by the electron beam irradiation is not particularly limited and may be, e.g., 100 to 1000 kV. If the acceleration voltage is less than 100 kV, there may be a lack of energy transmission. If the acceleration voltage is more than 1000 kV, economic efficiency may be reduced. Moreover, the irradiation amount of the electron beam is not particularly limited and may be, e.g., 5 to 100 kGy. If the irradiation amount is less than 5 kGy, curing failure may occur. If the irradiation amount is 100 kGy or more, the fibers may be degraded. When the fiber treatment agent for electron beam fixing is a solution obtained by diluting the silicone with an organic solvent, the fibers may be immersed (washed) in the organic solvent that has been used for dilution of the silicone, after the electron beam irradiation, thereby removing unreacted silicone. On the other hand, when the fiber treatment agent for electron beam fixing is an emulsion obtained by dispersing the silicone in water, the fibers may be washed with water after the electron beam irradiation, thereby removing unreacted silicone.

EXAMPLES

Next, embodiments of the present invention will be described in detail based on examples. However, the present invention is not limited to the following examples. In the following examples and comparative examples, the term "part" indicates "part by mass" and the physical property values indicate measured values by the following test methods.

(Measurement of Initial Amount of Si)

Using an X-ray fluorescence analyzer ZSX100e manufactured by Rigaku Corporation, the mass of all elements ($W0t$) and the mass of Si atoms ($W0s$) contained in each sample before washing were measured by the EZ-scan method, and the initial amount of Si was calculated by the following formula.

$$\text{Initial amount of Si (\% by mass)} = (W0s)/(W0t) \times 100$$

(Measurement of Amount of Si after Washing)

The samples were washed 10 times or 50 times in accordance with the JIS L 0217 103 method (detergent: JAFET) and dried. Then, using the X-ray fluorescence analyzer ZSX100e manufactured by Rigaku Corporation, the mass of all elements ($W10t$ or $W50t$) and the mass of Si atoms ($W10s$ or $W50s$) contained in the individual samples after 10 times washing or 50 times washing were measured by the EZ-scan method, and the amount of Si after 10 times washing and the amount of Si after 50 times washing were calculated by the following formulas.

Amount of Si after 10 times washing (% by mass)= $(W10s)/(W10t) \times 100$

Amount of Si after 50 times washing (% by mass)= $(W50s)/(W50t) \times 100$ (Initial Texture)

Three panelists touched the samples by hand to check the softness of the samples and evaluated them based on the following criteria.

A: very good
B: good
C: poor (Texture after Washing)

The samples were washed 10 times or 50 times in accordance with the JIS L 0217 103 method (detergent: JAFET). Subsequently, three panelists touched the samples by hand to check the softness of the samples after washing and evaluated them based on the following criteria.

A: very good
B: good
C: poor

Example 1

First, an acrylic-modified organopolysiloxane (A1) represented by the following average molecular formula (IV) was diluted with toluene to prepare a fiber treatment agent (a) in which the concentration of the acrylic-modified organopolysiloxane (A1) was 10% by mass. Next, a broadcloth made of 100% by mass of cotton (manufactured by KURABO) was immersed in the fiber treatment agent (a), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/15/180L (manufactured by IWASAKI ELECTRIC CO., LTD.). The fibers (i.e., the broadcloth made of 100% by mass of cotton) thus treated with the electron beam were immersed in toluene for 1 minute and then squeezed by a mangle roller at a squeeze rate of 60%. Further, the fibers were again immersed in fresh toluene for 1 minute, squeezed by a mangle roller at a squeeze rate of 60%, and dried at 110° C. for 90 seconds. Thus, the fibers to which silicone had been fixed were produced.

[Chemical Formula 7]

$$M_3D_{114}D^4{}_6T \quad (IV)$$

(in the average molecular formula (IV), M=$(CH_3)_3SiO_{1/2}$, D=$(CH_3)_2SiO_{2/2}$, $D^4$=$CH_3R^9SiO_{2/2}$, T=$CH_3SiO_{3/2}$, and $R^9$ represents a monovalent hydrocarbon group represented by the following general formula (V).)

[Chemical Formula 8]

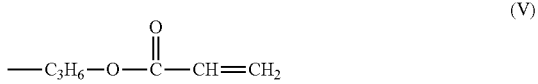

$$—C_3H_6—O—\overset{\overset{\displaystyle O}{\|}}{C}—CH{=}CH_2 \quad (V)$$

Example 2

An acrylic-modified organopolysiloxane (A2) represented by the following average molecular formula (VI) was diluted with toluene to prepare a fiber treatment agent (b) in which the concentration of the acrylic-modified organopolysiloxane (A2) was 10% by mass. A broadcloth made of 100% by mass of cotton (manufactured by KURABO) was immersed in the fiber treatment agent (b), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/30/90L (manufactured by IWASAKI ELECTRIC CO., LTD.). The fibers (i.e., the broadcloth made of 100% by mass of cotton) thus treated with the electron beam were immersed in toluene for 1 minute and then squeezed by a mangle roller at a squeeze rate of 60%. Further, the fibers were again immersed in fresh toluene for 1 minute, squeezed by a mangle roller at a squeeze rate of 60%, and dried at 110° C. for 90 seconds. Thus, the fibers to which silicone had been fixed were produced.

[Chemical Formula 9]

$$M_3D_{180}D^4{}_{18}T \quad (VI)$$

(in the average molecular formula (VI), M=$(CH_3)_3SiO_{1/2}$, D=$(CH_3)_2SiO_{2/2}$, $D^4$=$CH_3R^9SiO_{2/2}$, T=$CH_3SiO_{3/2}$, and $R^9$ represents a monovalent hydrocarbon group represented by the following general formula (V).)

[Chemical Formula 10]

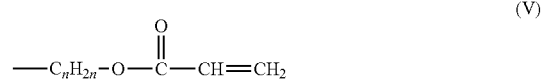

$$—C_nH_{2n}—O—\overset{\overset{\displaystyle O}{\|}}{C}—CH{=}CH_2 \quad (V)$$

Example 3

First, 300 g of the acrylic-modified organopolysiloxane (A2) used in Example 2, 7.8 g of polyoxyethylene (4) lauryl ether (product name "EMULGEN 104P" manufactured by Kao Corporation, nonionic surfactant, HLB value: 9.6), and 22.2 g of polyoxyethylene (23) lauryl ether (product name "EMULGEN 123P" manufactured by Kao Corporation, nonionic surfactant, HLB value: 16.9) were charged in a 2 L polyethylene jug and sufficiently mixed at a high speed with a homomixer. Then, 18 g of phase-inverted water (ion-exchanged water) was added to the mixture and kneaded. Subsequently, 280 g of ion-exchanged water was added to the mixture and mixed at 2500 rpm for 20 minutes with a homomixer. Thus, an oil-in-water emulsion (I) in which the concentration of the acrylic-modified organopolysiloxane (A2) was 50% by mass was obtained. The oil-in-water emulsion (I) was further diluted with ion-exchanged water to prepare a fiber treatment agent (c) in which the concentration of the acrylic-modified organopolysiloxane (A2) was 10% by mass. A broadcloth made of 100% by mass of cotton (manufactured by KURABO) was immersed in the fiber treatment agent (c), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/30/90L (manufactured by IWASAKI ELECTRIC CO., LTD.). The fibers (i.e., the broadcloth made of 100% by mass of cotton) thus treated with the electron beam were washed with water, squeezed by a mangle roller at a squeeze rate of 60%, and dried at 110° C. for 90 seconds. Thus, the fibers to which silicone had been fixed were produced.

Example 4

First, 300 g of an amino-modified organopolysiloxane (B1) represented by the following average molecular formula (VII), 1.8 g of polyoxyethylene (4) lauryl ether (product name "EMULGEN 104P" manufactured by Kao Corporation, nonionic surfactant, HLB value: 9.6), and 4.2 g of polyoxyethylene (23) lauryl ether (product name "EMULGEN 123P" manufactured by Kao Corporation, nonionic surfactant, HLB value: 16.9) were charged in a 2 L polyethylene jug and sufficiently mixed at a high speed with a homomixer. Then, 18 g of phase-inverted water (ion-exchanged water) was added to the mixture and kneaded. Subsequently, 280 g of ion-exchanged water was added to the mixture and mixed at 2500 rpm for 20 minutes with a homomixer. Thus, an oil-in-water emulsion (II) in which the concentration of the amino-modified organopolysiloxane (B1) was 50% by mass was obtained. The oil-in-water emulsion (II) was mixed with the oil-in-water emulsion (I) prepared in the same manner as Example 3 at a ratio of the oil-in-water emulsion (I) to the oil-in-water emulsion (II) of 50 parts by mass/50 parts by mass to form an oil-in-water emulsion (III). The oil-in-water emulsion (III) was diluted with ion-exchanged water to prepare a fiber treatment agent (d) in which the concentration of the organopolysiloxane (i.e., the total concentration of the acrylic-modified organopolysiloxane (A2) and the amino-modified organopolysiloxane (B1)) was 10% by mass. A broadcloth made of 100% by mass of cotton (manufactured by KURABO) was immersed in the fiber treatment agent (d), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/30/90L (manufactured by IWASAKI ELECTRIC CO., LTD.). The fibers (i.e., the broadcloth made of 100% by mass of cotton) thus treated with the electron beam were washed with water, squeezed by a mangle roller at a squeeze rate of 60%, and dried at 110° C. for 90 seconds. Thus, the fibers to which silicone had been fixed were produced.

[Chemical Formula 11]

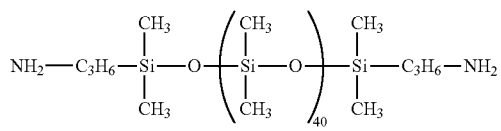

(VII)

Comparative Example 1

First, a dimethylpolysiloxane having no organic group other than a methyl group and having a viscosity of 1000 mm²/s was diluted with toluene to prepare a fiber treatment agent (Z) in which the concentration of the dimethylpolysiloxane was 10% by mass. A broadcloth made of 100% cotton (manufactured by KURABO) was immersed in the fiber treatment agent (Z), squeezed by a mangle roller at a squeeze rate of 60%, and dried at 110° C. for 90 seconds. Then, the broadcloth was irradiated with an electron beam of 40 kGy at an acceleration voltage of 200 kV in a nitrogen atmosphere using an area beam type electron beam irradiation apparatus EC250/30/90L (manufactured by IWASAKI ELECTRIC CO., LTD.). The fibers (i.e., the broadcloth made of 100% cotton) thus treated with the electron beam were immersed in a toluene solution for 1 minute and then squeezed by a mangle roller at a squeeze rate of 60%. Further, the fibers were again immersed in a fresh toluene solution for 1 minute, squeezed by a mangle roller at a squeeze rate of 60%, and dried at 110° C. for 90 seconds.

Comparative Example 2

A fiber treatment agent (c) was prepared in the same manner as Example 3. A broadcloth made of 100% cotton (manufactured by KURABO) was immersed in the fiber treatment agent (c), squeezed by a mangle roller at a squeeze rate of 60%, and dried at 110° C. for 90 seconds. Then, the fibers (i.e., the broadcloth made of 100% cotton) thus treated with the fiber treatment agent (c) were washed with water, squeezed by a mangle roller at a squeeze rate of 60%, and dried at 110° C. for 90 seconds.

Comparative Example 3

An oil-in-water emulsion (II) in which the concentration of an amino-modified organopolysiloxane (B1) was 50% by mass was prepared in the same manner as Example 4. The oil-in-water emulsion (II) was diluted with ion-exchanged water to prepare a fiber treatment agent (Y) in which the concentration of the amino-modified organopolysiloxane (B1) was 10% by mass. A broadcloth made of 100% cotton (manufactured by KURABO) was immersed in the fiber treatment agent (Y), squeezed by a mangle roller at a squeeze rate of 60%, and dried at 110° C. for 90 seconds. Then, the fibers (i.e., the broadcloth made of 100% cotton) thus treated with the fiber treatment agent (Y) were washed with water, squeezed by a mangle roller at a squeeze rate of 60%, and dried at 110° C. for 90 seconds.

The initial amount of Si (the amount of Si before washing), the amount of Si after 10 times washing, the amount of Si after 50 times washing, the initial texture, and the texture after washing of the respective fibers (i.e., the broadcloths made of 100% cotton) obtained in Examples 1 to 4 and Comparative Examples 1 to 3 were measured in the above manner. Table 1 shows the results.

TABLE 1

| | Amount of Si (% by mass) | | | Texture | | |
|---|---|---|---|---|---|---|
| | Before washing | After 10 times washing | After 50 times washing | Initial | After 10 times washing | After 50 times washing |
| Ex. 1 | 0.520 | 0.343 | 0.140 | B | B | C |
| Ex. 2 | 0.541 | 0.548 | 0.441 | B | B | B |
| Ex. 3 | 0.880 | 0.788 | — | B | B | B |
| Ex. 4 | 1.250 | 1.130 | 0.738 | A | A | A |
| Comp. Ex. 1 | 0.037 | 0.015 | 0.006 | B | C | C |
| Comp. Ex. 2 | 0.056 | 0.025 | — | B | C | C |
| Comp. Ex. 3 | 0.520 | 0.190 | — | A | C | C |

In Examples 1 and 2, the fibers had been immersed in the fiber treatment agent, in which the acrylic-modified organopolysiloxane (A) having two or more acrylic groups per molecule (represented by the general formula (I)) was diluted with the organic solvent, and then irradiated with the electron beam. Consequently, these fibers had good softness, and the acrylic-modified organopolysiloxane (A) was fixed to the fibers even after washing. Specifically, a considerable amount of the acrylic-modified organopolysiloxane (A) was fixed to the fibers after they were washed 10 times. In particular, in Example 2, a considerable amount of the acrylic-modified organopolysiloxane (A) was fixed to the fibers even after they were washed 50 times. The fixing properties of the acrylic-modified organopolysiloxane (A) to the fibers were higher in Example 2 than in Example 1, since the acrylic-modified organopolysiloxane (A) used in Example 2 had a large number of acrylic groups as compared to the acrylic-modified organopolysiloxane (A) used in Example 1.

In Example 3, the fibers had been treated with the fiber treatment agent, in which the acrylic-modified organopolysiloxane (A) having two or more acrylic groups per molecule (represented by the general formula (I)) was emulsified. Consequently, the fibers also had good softness. Comparing Example 3 and Example 4 shows that when the acrylic-modified organopolysiloxane (A) having two or more acrylic groups per molecule (represented by the general formula (I)) was used in combination with the amino-modified organopolysiloxane (B) having one or more amino groups per molecule (represented by the general formula (III)), the initial amount of silicone fixed to the fibers was increased, the softness of the fibers was very good, and the organopolysiloxane was sufficiently fixed to the fibers even after 10 times washing as well as 50 times washing.

On the other hand, in Comparative Example 1, the fibers had been treated with the dimethylpolysiloxane having no acrylic group. Consequently, the initial amount of dimethylpolysiloxane adhering to the fibers was small, and almost no dimethylpolysiloxane was left after the fibers were washed 10 times or 50 times. In Comparative Example 2, the fibers had been treated with the fiber treatment agent in which the acrylic-modified organopolysiloxane (A) having two or more acrylic groups per molecule (represented by the general formula (I)) was emulsified, but had not been subjected to electron beam irradiation. Consequently, the amount of the acrylic-modified organopolysiloxane (A) adhering to the fibers was small, and the softness of the fibers was poor. In Comparative Example 3, the fibers had been treated with the fiber treatment agent, in which the amino-modified organopolysiloxane (B) having one or more amino groups per molecule (represented by the general formula (III)) was emulsified. Consequently, although a considerable amount of the amino-modified organopolysiloxane (B) adhered to the fibers at the initial stage (washing), the amount of the amino-modified organopolysiloxane (B) was significantly reduced after washing, and the softness of the fibers became poor.

In the Examples, it was found that the acrylic-modified organopolysiloxane (A) was graft-polymerized onto the fibers, and crosslinking between the silicone components also proceeded, so that the silicone was firmly fixed to the fibers, and thus the fibers had good softness even after washing. On the other hand, in the Comparative Examples, it was found that the silicone was not fixed to the fibers.

The invention claimed is:

1. A fiber treatment agent for electron beam fixing comprising
an acrylic-modified organopolysiloxane (A) having two or more acrylic groups per molecule, as represented by the following general formula (I), and an amino-modified organopolysiloxane (B) having one or more amino groups per molecule, as represented by the following general formula (III):

$$M_a M^4_b D_c D^4_d T_e \quad (I)$$

(in the general formula (I),
$M = R^1 R^2 R^3 SiO_{1/2}$,
$M^4 = R^4 R^5 R^6 SiO_{1/2}$,
$D = R^7 R^8 SiO_{2/2}$,
$D^4 = R^9 R^{10} SiO_{2/2}$,
$T = R^{11} SiO_{3/2}$,
$R^1$, $R^2$, $R^3$, $R^5$, $R^6$, $R^7$, $R^8$, $R^{10}$, and $R^{11}$ each independently represent a hydrogen atom, an alkyl group having 1 to 4 carbon atoms, or a phenyl group, $R^4$ and $R^9$ each independently represent a monovalent hydrocarbon group represented by the following general formula (II), a, b, c, and d each independently are 0 or a positive integer, e is an integer of 0 to 3, c+d is an integer of 10 to 1000, b+d is an integer of at least 2, and a+b is an integer equal to e+2);

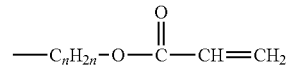

(in the general formula (II), n is an integer of 1 to 3);

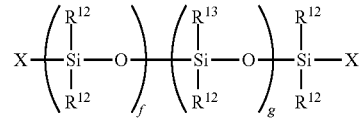

(in the general formula (III), $R^{12}$ represents a substituted or unsubstituted monovalent hydrocarbon group having 1 to 20 carbon atoms, $R^{13}$ represents a monovalent group represented by —$R^{14}$—(NH—$R^{15}$)h-NH$_2$, X represents a monovalent group represented by $R^{12}$, $R^{13}$, or —$OR^{16}$, $R^{14}$ represents a divalent hydrocarbon group having 1 to 8 carbon atoms, $R^{15}$ represents a divalent hydrocarbon group having 1 to 4 carbon atoms, $R^{16}$ represents a hydrogen atom or a monovalent hydrocarbon group having 1 to 8 carbon atoms, f is an integer of 5 to 500, g is an integer of 0 to 100, and h is an integer of 0 to 4, where if g is 0, at least one of two Xs is $R^{13}$).

2. The fiber treatment agent for electron beam fixing according to claim 1, wherein in the general formula (I), (b+d)/(a+b+c+d)×100 is 0.5 to 40.

3. The fiber treatment agent for electron beam fixing according to claim 1, wherein when a total mass of the acrylic-modified organopolysiloxane (A) and the amino-modified organopolysiloxane (B) is 100% by mass, a blending amount of the acrylic-modified organopolysiloxane (A) is 10 to 95% by mass and a blending amount of the amino-modified organopolysiloxane (B) is 5 to 90% by mass.

4. The fiber treatment agent for electron beam fixing according to claim 1, wherein the fiber treatment agent for electron beam fixing is in a form of emulsion.

5. The fiber treatment agent for electron beam fixing according to claim 1, wherein in the general formula (I), $R^1$, $R^2$, $R^3$, $R^5$, $R^6$, $R^7$, $R^8$, $R^{10}$ and $R^{11}$ each represent a methyl group.

6. The fiber treatment agent for electron beam fixing according to claim 1, wherein in the general formula (II), n is 3.

7. The fiber treatment agent for electron beam fixing according to claim 1, wherein in the general formula (III), $R^{12}$ represents a methyl group, $R^{14}$ represents a trimethylene group, and $R^{15}$ represents a dimethylene group.

8. The fiber treatment agent for electron beam fixing according to claim 1, wherein in the general formula (III), X represents a methyl group and/or a methoxy group.

* * * * *